(12) United States Patent
Hasegawa et al.

(10) Patent No.: US 10,727,713 B2
(45) Date of Patent: Jul. 28, 2020

(54) ROTARY ELECTRIC MACHINE

(71) Applicant: Mitsubishi Electric Corporation, Tokyo (JP)

(72) Inventors: Kazuya Hasegawa, Tokyo (JP); Mitsuyasu Okamoto, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 16/303,203

(22) PCT Filed: Jun. 1, 2016

(86) PCT No.: PCT/JP2016/066171
§ 371 (c)(1),
(2) Date: Nov. 20, 2018

(87) PCT Pub. No.: WO2017/208387
PCT Pub. Date: Dec. 7, 2017

(65) Prior Publication Data
US 2019/0207458 A1 Jul. 4, 2019

(51) Int. Cl.
*H02K 3/34* (2006.01)
*H02K 1/18* (2006.01)
(Continued)

(52) U.S. Cl.
CPC .............. *H02K 3/34* (2013.01); *H02K 1/04* (2013.01); *H02K 1/18* (2013.01); *H02K 1/185* (2013.01);
(Continued)

(58) Field of Classification Search
CPC ............ H02K 3/34; H02K 15/02; H02K 1/04; H02K 15/026; H02K 1/185; H02K 3/522; H02K 15/028; H02K 1/18
(Continued)

(56) References Cited

U.S. PATENT DOCUMENTS

| 4,211,944 A | 7/1980 | Haller |
| 5,034,643 A * | 7/1991 | Trian ..................... H02K 3/345 310/215 |

(Continued)

FOREIGN PATENT DOCUMENTS

| CN | 101227107 A | 7/2008 |
| CN | 103201931 A | 7/2013 |

(Continued)

OTHER PUBLICATIONS

Communication dated Apr. 2, 2019 by the European Patent Office in application No. 16904012.8.
(Continued)

*Primary Examiner* — Alfonso Perez Borroto
*Assistant Examiner* — Ahmed Elnakib
(74) *Attorney, Agent, or Firm* — Sughrue Mion, PLLC; Richard C. Turner

(57) ABSTRACT

A rotary electric machine according to the present invention includes: a stator including: a stator core; and a stator winding that is mounted to the stator core, and into which a varnish is impregnated, the stator being held by a housing in a state in which housing interfitting surfaces on two axial end surfaces of a core back portion are clamped by the housing from two axial ends, wherein a varnish leakage stopping portion is formed radially inside the housing interfitting surfaces on two axial end surfaces of the stator core so as to interrupt flow pathways of the varnish from a radially inner side onto the housing interfitting surfaces.

9 Claims, 6 Drawing Sheets

(51) Int. Cl.
*H02K 15/12* (2006.01)
*H02K 15/02* (2006.01)
*H02K 1/04* (2006.01)
*H02K 3/52* (2006.01)

(52) U.S. Cl.
CPC ............ *H02K 3/522* (2013.01); *H02K 15/02* (2013.01); *H02K 15/026* (2013.01); *H02K 15/028* (2013.01); *H02K 15/12* (2013.01)

(58) Field of Classification Search
USPC .............................. 310/45, 260, 270; 29/596
See application file for complete search history.

(56) References Cited

U.S. PATENT DOCUMENTS

| | | | | |
|---|---|---|---|---|
| 6,429,552 B2* | 8/2002 | Asao | ........................ | H02K 3/38 310/180 |
| 6,486,586 B2* | 11/2002 | Higashino | ................ | H02K 3/38 310/260 |
| 7,284,312 B2* | 10/2007 | Oohashi | ................. | H02K 15/12 29/596 |
| 9,118,234 B2* | 8/2015 | Tsukamoto | ............ | H02K 3/522 |
| 10,148,140 B2* | 12/2018 | Suzuki | ................... | H02K 1/185 |
| 2005/0258703 A1* | 11/2005 | Kouda | ..................... | H02K 3/12 310/180 |
| 2006/0066172 A1* | 3/2006 | Takeuchi | ............... | H02K 1/148 310/52 |
| 2007/0046136 A1* | 3/2007 | Higashino | ................ | H02K 3/38 310/260 |
| 2009/0200887 A1* | 8/2009 | Okamoto | ............... | H02K 1/185 310/195 |
| 2010/0156204 A1* | 6/2010 | Endo | ...................... | H02K 3/522 310/44 |
| 2011/0285240 A1* | 11/2011 | Tsukamoto | ............ | H02K 3/522 310/215 |
| 2013/0221781 A1 | 8/2013 | Nakayama et al. | | |
| 2014/0210306 A1* | 7/2014 | Suzuki | ..................... | H02K 5/15 310/216.134 |
| 2019/0207458 A1* | 7/2019 | Hasegawa | .............. | H02K 15/02 |

FOREIGN PATENT DOCUMENTS

| | | |
|---|---|---|
| EP | 2 639 933 A1 | 9/2013 |
| JP | 61-173642 A | 8/1986 |
| JP | 02-026243 A | 1/1990 |
| JP | 02-051338 A | 2/1990 |
| JP | H0251338 B2 * | 11/1990 |
| JP | 06-303747 A | 10/1994 |
| JP | 07-039120 A | 2/1995 |
| JP | 2001-169493 A | 6/2001 |
| JP | 2006-187059 A | 7/2006 |
| JP | 2013-132113 A | 7/2013 |
| WO | 2007/029886 A1 | 3/2007 |

OTHER PUBLICATIONS

International Search Report of PCT/JP2016/066171 dated Sep. 6, 2016.

Communication dated Dec. 4, 2019 issued by the State Intellectual Property Office of People's Republic of China in counterpart Chinese Application No. 201680086129.6.

* cited by examiner

ROTARY ELECTRIC MACHINE

CROSS REFERENCE TO RELATED APPLICATIONS

This application is a National Stage of International Application No. PCT/JP2016/066171 filed Jun. 1, 2016.

TECHNICAL FIELD

The present invention relates to a rotary electric machine such as a generator, an electric motor, etc., and relates particularly to a construction of a stator core that prevents varnish from leaking out onto housing interfitting surfaces of the stator core during a step of impregnating varnish into a stator winding.

BACKGROUND ART

In stators of rotary electric machines, a treatment is performed to impregnate varnish into a stator winding in order to suppress occurrences of insulation failure that results from pinholing and damage to the insulating coating of conductor wires that constitute the stator winding, to strengthen physical support of the stator winding, or to make the stator core effectively transfer heat generated in the stator winding.

In conventional rotary electric machines, a stator core onto which a stator winding has been mounted is preheated, a varnish is dripped onto coil ends while rotating the preheated stator core around a central axis, the varnish is impregnated into the stator winding, and then the varnish that has impregnated into the stator winding is cured by heating the stator core (see Patent Literature 1, for example).

CITATION LIST

Patent Literature

Patent Literature 1: Japanese Patent Laid-Open No. 2006-187059 (Gazette)

SUMMARY OF THE INVENTION

Problem to be Solved by the Invention

In rotary electric machines, compactness and high output are in demand, and space factor in stator winding has increased. With this increase in space factor in stator windings, penetration of the varnish into the stator winding decreases, lengthening the time taken to impregnate the varnish. Then, if a low-viscosity varnish is used in order to attempt to shorten the time taken in the step of impregnating the varnish, some of the varnish that has dripped onto the coil ends leaks out to end surfaces of a core back portion.

The end surfaces of the core back portion constitute housing interfitting surfaces that are clamped by a housing from two axial directions. If the varnish that has leaked out onto the housing interfitting surfaces of the core back portion hardens, then the holding strength of the stator core by the housing is reduced. Thus, one problem has been that a trimming step is required to remove the hardened varnish, reducing productivity.

In the trimming step, portions of the core back portion are scraped off together with the hardened varnish. When holding the stator core in the housing, scratch marks from removal of hardened varnish that are formed at varnish interfitting surfaces form gaps. Thus, one problem has been that if salt water, etc., enters these gaps, the stator core and the housing will corrode.

The present applicants have conducted successive diligent investigations into drip impregnation methods in which a varnish is dripped onto coil ends of a stator winding to impregnate the stator winding with the varnish, and have succeeded in inventing the present invention by finding that in the process of the varnish that has been dripped onto the coil ends proceeding to penetrate into internal portions of slots from coil ends due to capillary action between conductor wires, a portion thereof leaks out at end surfaces of tooth portions and flows out onto end surfaces of a core back portion via the end surfaces of the tooth portions.

The present invention aims to solve the above problems and an object of the present invention is to provide a rotary electric machine that can improve productivity of a stator, and that can also suppress occurrence of corrosion of a stator core and a housing that results from scratch marks due to removal of hardened varnish by enabling a portion of a varnish to be prevented from leaking out onto housing interfitting surfaces at end surfaces of a core back portion via end surfaces of tooth portions during a step of impregnating the varnish, to eliminate a need for a trimming step.

Means for Solving the Problem

A rotary electric machine according to the present invention includes: a housing; a rotor that is fixed to a rotating shaft that is rotatably supported by the housing, the rotor being disposed inside the housing; and a stator including: a stator core in which tooth portions are arranged circumferentially in a state in which each protrudes radially inward from an inner circumferential wall surface of an annular core back portion; and a stator winding that is mounted to the stator core, and into which a varnish is impregnated, the stator being held by the housing in a state in which housing interfitting surfaces on two axial end surfaces of the core back portion are clamped by the housing from two axial ends, and the stator being disposed so as to surround the rotor, wherein a varnish leakage stopping portion is formed radially inside the housing interfitting surfaces on two axial end surfaces of the stator core so as to interrupt flow pathways of the varnish from a radially inner side onto the housing interfitting surfaces.

Effects of the Invention

According to the present invention, a varnish leakage stopping portion is formed radially inside housing interfitting surfaces on two axial end surfaces of a stator core so as to interrupt flow pathways of varnish from a radially inner side onto the housing interfitting surfaces. Thus, when impregnating a stator winding with the varnish, flow of varnish that leaks out and flows over the end surfaces of the tooth portions to the housing interfitting surfaces is stopped by the varnish leakage stopping portions. Thus, because adhesion of hardened varnish onto the housing interfitting surfaces is eliminated, and a trimming step is no longer required, productivity of the stator is improved. The occurrence of corrosion of the stator core and the housing that results from scratch marks due to removal of the hardened varnish is also suppressed.

DESCRIPTION OF EMBODIMENTS

Embodiment 1

Figure 1:
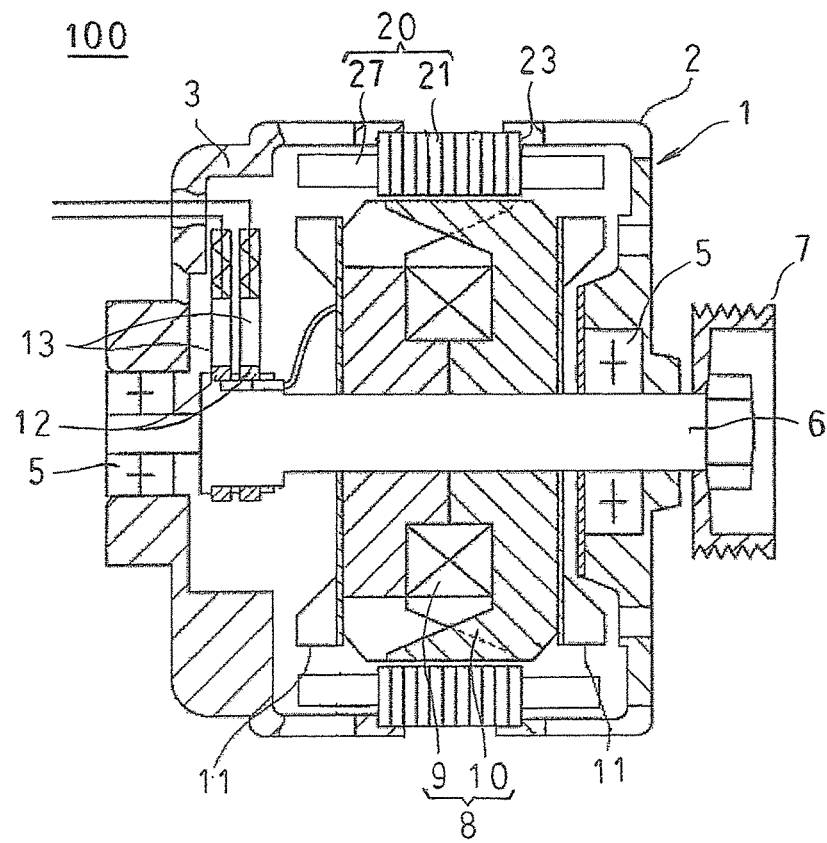
FIG. 1 is a cross section that shows a rotary electric machine according to Embodiment 1 of the present invention.
Figure 2:
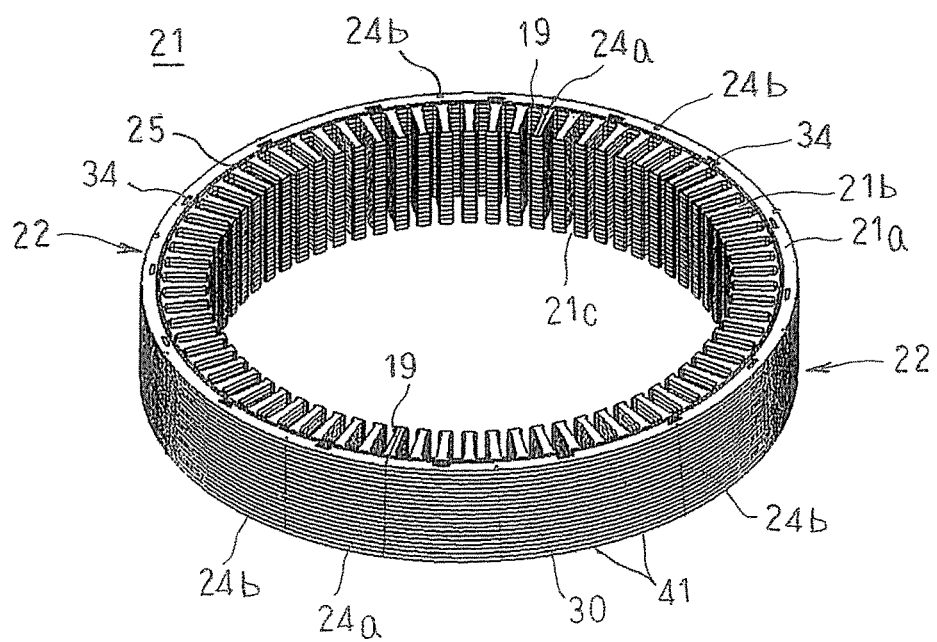
FIG. 2 is an oblique projection that shows a stator core of the rotary electric machine according to Embodiment 1 of the present invention.
Figure 3:
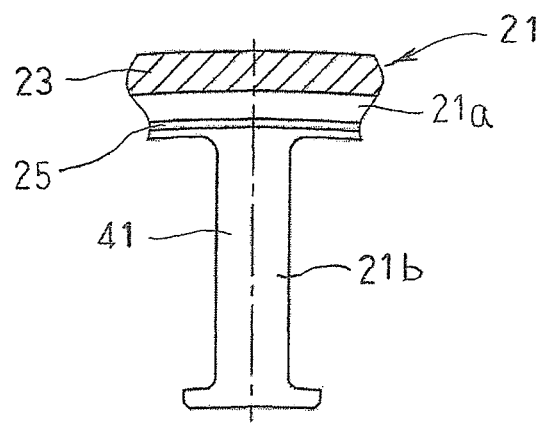
FIG. 3 is an end elevation that shows part of the stator core of the rotary electric machine according to Embodiment 1 of the present invention.

FIG. 1 is a cross section that shows a rotary electric machine according to Embodiment 1 of the present invention, FIG. 2 is an oblique projection that shows a stator core of the rotary electric machine according to Embodiment 1 of the present invention, and FIG. 3 is an end elevation that shows part of the stator core of the rotary electric machine according to Embodiment 1 of the present invention.

In FIG. 1, a rotary electric machine 100 includes: a housing 1 that is constituted by a front bracket 2 and a rear bracket 3 that are each approximately bowl-shaped and made of aluminum; a shaft 6 that is rotatably supported in the housing 1 by means of a pair of bearings 5; a pulley 7 that is fixed to an end portion of the shaft 6 that projects out frontward from the housing 1; a rotor 8 that is fixed to the shaft 6 and that is disposed inside the housing 1; a stator 20 that is fixed to the housing 1 so as to surround the rotor 8; a pair of slip rings 12 that are fixed to a portion of the shaft 6 that projects out rearward from the housing 1, and that supply electric current to the rotor 8; and a pair of brushes 15 that are disposed so as to slide on the respective slip rings 12. Moreover, although not shown, a rectifying apparatus that rectifies alternating-current voltages that are generated in the stator 20 into direct-current voltages, and a voltage regulator that adjusts magnitude of the alternating-current voltages that are generated in the stator 20, etc., are included.

The rotor 8 includes: a field winding 9 that generates magnetic flux on passage of an excitation current; and a pole core 10 on which magnetic poles are formed by the magnetic flux that is generated by the field winding 9. The pole core 10 is fixed to the rotating shaft 6, which passes through a central position of the pole core 10, and is rotatably disposed inside the housing 1. Cooling fans 11 are fixed to two axial end surfaces of the pole core 10 by welding, etc.

The stator 20 includes: an annular stator core 21 that is disposed so as to be coaxial to the rotor 8, and that surrounds the rotor 8; and a stator winding 27 that is mounted to the stator core 21, into which a varnish is impregnated, and in which an alternating current is generated by changes in the magnetic flux from the field winding 9 that accompany rotation of the rotor 8. The stator 20 is held by the housing 1 by outer circumferential edge portions at two axial end surfaces of the stator core 21 being clamped between opening end surfaces of the front bracket 2 and the rear bracket 3 from two axial ends.

As shown in FIG. 2, the stator core 21 is produced so as to have an annular shape by butting together two circumferential end surfaces of two semicircular split cores 22, and laser-welding the butted portions 19 thereof from radially outside from a first axial end to a second axial end. Moreover, in the figure, weld portions 24a are weld portions at the butted portions 19. Furthermore, weld portions 24b are weld portions that integrate laminated bodies of magnetic segments 30 and end plates 41 that constitute the split cores 22, and are formed on outer circumferential surfaces of the split cores 22 so as to extend from a first axial end to a second axial end.

As shown in FIGS. 2 and 3, the stator core 21 includes: an annular core back portion 21a; and tooth portions 21b that each protrude radially inward from an inner circumferential wall surface of the core back portion 21a, and that are arranged at a uniform angular pitch circumferentially. Slots 21c that are constituted by regions that are surrounded by adjacent tooth portions 21b and the core back portion 21a are disposed at a uniform angular pitch in a circumferential direction so as to have openings on a radially inner side. Annular regions of outer circumferential edge portions on two end surfaces of the core back portion 21a constitute housing interfitting surfaces 23 that fit together with opening edge portions of the front bracket 2 and the rear bracket 3. Varnish leakage stopping projections 25 that function as varnish leakage stopping portions are formed so as to have annular shapes on inner circumferential sides of the housing interfitting surfaces 23 on the two end surfaces of the core back portion 21a.

Figure 4:
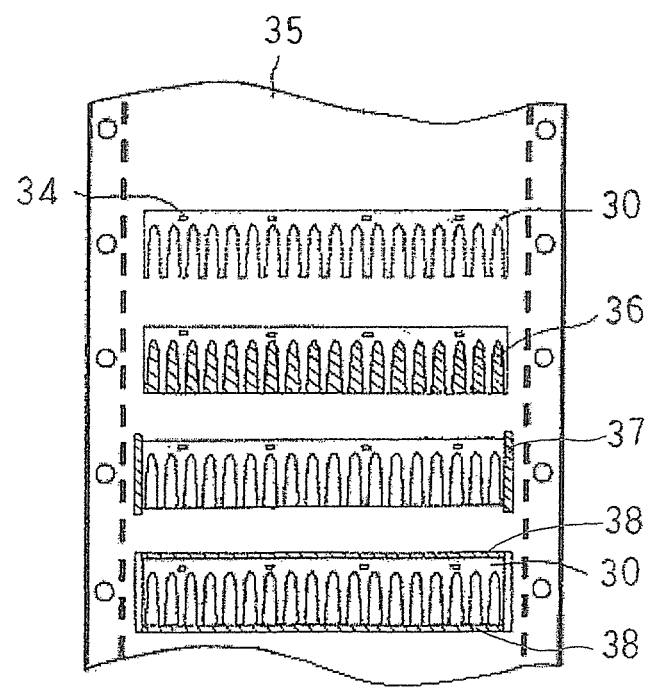
FIG. 4 is a plan that explains a method for forming magnetic segments from an electromagnetic steel sheet.
Figure 7:
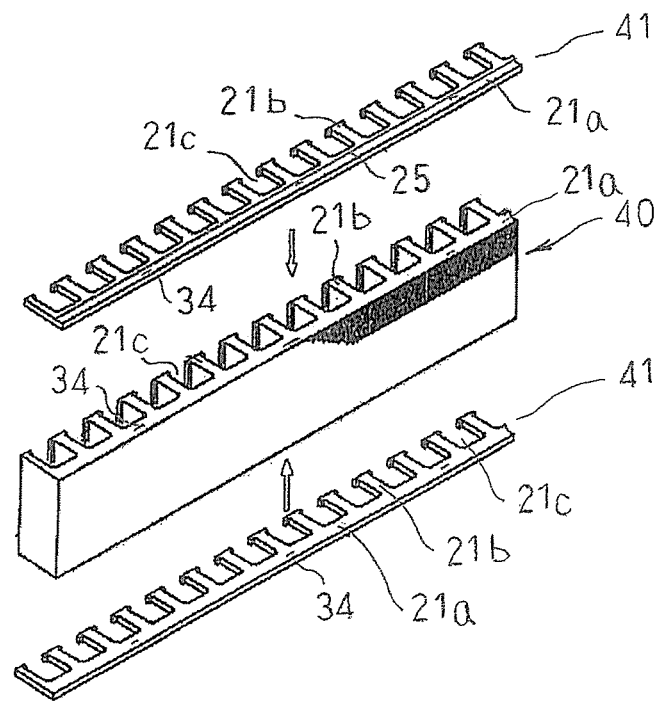
FIG. 7 is an oblique projection that explains a method for assembling a split core.
Figure 8:
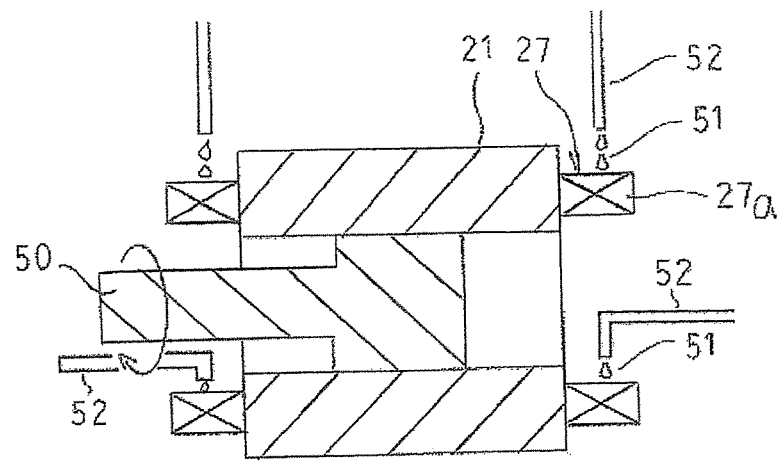
FIG. 8 is a schematic diagram that shows a step of impregnating a varnish.

A manufacturing method for the stator core 21 will now be explained. FIG. 4 is a plan that explains a method for forming magnetic segments from an electromagnetic steel sheet, FIG. 5 is a plan that shows a magnetic segment that has been punched from the electromagnetic steel sheet, FIG. 6 is an oblique projection that shows a laminated body of magnetic segments, FIG. 7 is an oblique projection that explains a method for assembling a split core, and FIG. 8 is a schematic diagram that shows a step of impregnating a varnish.

Figure 5:
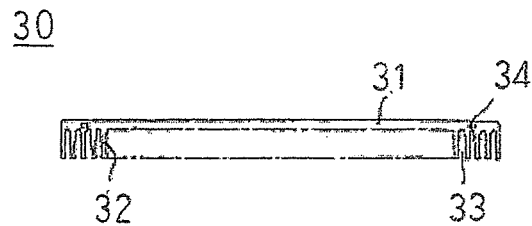
FIG. 5 is a plan that shows a magnetic segment that has been punched from the electromagnetic steel sheet.

As shown in FIG. 5, the magnetic segments 30 are oblong magnetic steel sheets that have a length that is half a circumferential length of the stator core 21, and include: core back corresponding portions 31 that extend longitudinally on a first width direction side; tooth corresponding portions 32 that protrude outward from the core back corresponding portion 31 on a second width direction side, and that are arranged at a uniform pitch in the longitudinal direction; slot corresponding portions 33 that are formed between the core back corresponding portions 31 and adjacent tooth corresponding portions 32; and crimping portions 34 that are press-molded into the core back corresponding portions 31.

To produce the magnetic segments 30, an electromagnetic steel sheet 35 that has a thickness of 0.35 mm is supplied to a pressing machine (not shown) as a magnetic steel sheet, and as shown in FIG. 4, unwanted portions are punched out while conveying the electromagnetic steel sheet 35 at a predetermined pitch. In this pressing step, the crimping portions 34 are first press molded. Next, the slot corresponding portions 33 are formed by punching out unwanted portions 36. Next, two longitudinal end portions of the magnetic segments 30 are formed by punching out unwanted portions 37. Next, the magnetic segments 30 are punched out by punching out unwanted portions 38.

Figure 6:
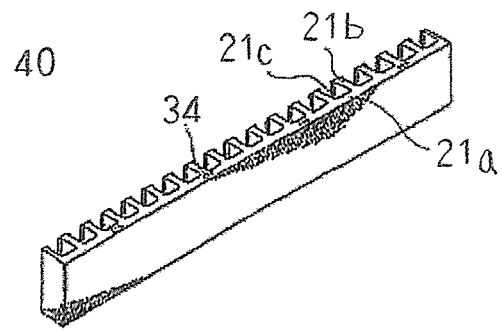
FIG. 6 is an oblique projection that shows a laminated body of magnetic segments.

Next, a predetermined number of the magnetic segments 30 are stacked together so as to align the core back corresponding portions 31 with each other, the tooth corresponding portions 32 with each other, and the slot corresponding portions 33 with each other, and the stacked magnetic segments 30 are fixed by crimping at the crimping portions 34, to produce the rectangular parallelepiped laminated body 40 that is shown in FIG. 6. The core back corresponding portions 31 are laminated to constitute the core back portion 21a, the tooth corresponding portions 32 are laminated to constitute the tooth portions 21b, and the slot corresponding portions 33 are laminated to constitute the slots 21c.

The end plates 41 are also punched out of an electromagnetic steel sheet that has a sheet thickness of 1.0 mm in a similar manner. The end plates 41 are formed so as to have a similar shape to the magnetic segments 30 except that the varnish leakage stopping projections 25 are formed on the core back portion 21a and the thicknesses are different. Next, as shown in FIG. 7, the end plates 41 are stacked on two ends in the thickness direction of the laminated body 40, and are fixed by crimping the laminated body 40 and the end plates 41 at the crimping portions 34, to produce a rectangular parallelepiped laminated core. Next, the weld portions 24b are formed on the outer circumferential surface of the core back portion 21a of the laminated core by laser welding in a plurality of strips that extend from the first end to the second end in the thickness direction, such that the laminated body 40 and the end plates 41 are fixed. Next, this rectangular parallelepiped laminated core is bent into a semicircular shape, to produce a split core 22. Next, the two circumferential end surfaces of two split cores 22 are butted together, and the butted portions 19 are laser-welded from radially outside, to form the annular stator core 21.

A stator winding 27 is mounted, and then the stator core 21 that is configured in this manner is preheated in a state of being held by an inside diameter holder 50. Next, a varnish 51 is dripped onto the coil ends 27a of the stator winding 27 from nozzles 52 while rotating the inside diameter holder 50, as shown in FIG. 8. The varnish 51 penetrates between the conductor wires due to capillary action, and is impregnated inside the slots 21c from the coil ends 27a. At this point, some of the varnish 51 leaks out to end surfaces of the tooth portions 21b, and flows out along the end surfaces of the tooth portions 21b to the end surfaces of the core back portion 21a. The flow of the varnish 51 toward the housing interfitting surfaces 23 is stopped by the varnish leakage stopping projections 25. The stopped varnish 51 falls off the stator core 21. When impregnation of the varnish 51 is complete, the stator core 21 is heated, and the varnish 51 that has impregnated into the stator winding 27 is cured, to obtain the stator 20.

According to Embodiment 1, varnish leakage stopping projections 25 are formed so as to have annular shapes on inner circumferential sides of housing interfitting surfaces 23 on two end surfaces of a core back portion 21a. Thus, when a varnish 51 is impregnated into a stator winding 27 using a drip impregnation method, varnish 51 that leaks out is stopped from flowing onto the housing interfitting surfaces 23 by the varnish leakage stopping projections 25, preventing hardened varnish from adhering to the housing interfitting surfaces 23. Thus, a step of grinding off the hardened varnish is no longer required, increasing productivity of the stator 20. Furthermore, because scratch marks from removal of the hardened varnish are not formed on the housing interfitting surfaces 23, at the interfitting portion between the stator core 21 and the housing 1, the occurrence of situations such as salt water, etc., accumulating in the scratch marks from removal of the hardened varnish, and causing the stator core 21 and the housing 1 to corrode can be prevented.

Because the varnish leakage stopping projections 25 are formed on surfaces of the end plates 41 of the stator core 21, the section modulus of the stator core 21 is increased, improving rigidity. Thus, the magnetic segments 30 and the end plates 41 are prevented from being turned up by axial forces that act on the stator core 21 when the stator winding 27 is mounted to the stator core 21.

Because the varnish leakage stopping projections 25 are formed on the end plates 41, which are thicker than the magnetic segments 30, heights of the varnish leakage stopping projections 25 can be increased, enabling leakage of the varnish 51 onto the housing interfitting surfaces 23 to be reliably stopped.

In Embodiment 1, because flowing of the varnish 51 onto the housing interfitting surfaces 23 from a radially inner side is stopped by the varnish leakage stopping projections 25, adhesion of the varnish 51 to the housing interfitting surfaces 23 can be suppressed using a low-viscosity varnish 51, enabling a greater amount of varnish 51 to be impregnated into the stator winding 27. Pinholes in and damage to the insulating coatings of the conductor wires are thereby sealed by the varnish, improving insulation of the stator winding 27. The varnish 51 impregnates inside the slots 21c sufficiently that the stator winding 27 is held firmly by the stator core 21, increasing vibration resistance of the stator winding 27. The inner wall surfaces of the slots 21c and the stator winding 27 are connected to each other thermally by the hardened varnish, and the heat generated in the stator winding 27 is radiated to the stator core 21 effectively. In addition, the space factor of the stator winding 27 can be increased without allowing hardened varnish to adhere to the housing interfitting surfaces 23, enabling a compact, high-output rotary electric machine 100 to be achieved.

Embodiment 2

Figure 9:
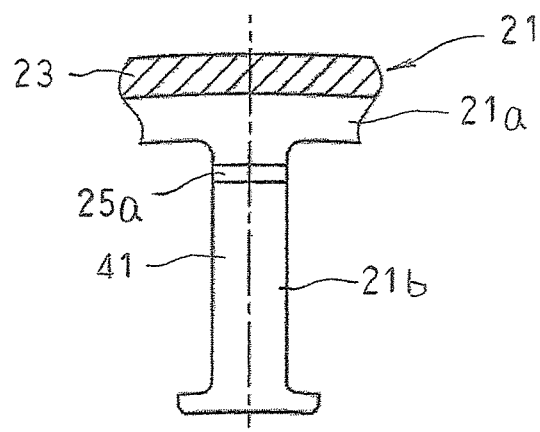
FIG. 9 is an end elevation that shows part of a stator core of a rotary electric machine according to Embodiment 2 of the present invention.

FIG. 9 is an end elevation that shows part of a stator core of a rotary electric machine according to Embodiment 2 of the present invention.

In FIG. 9, a varnish leakage stopping projection 25a is formed on a surface of an end plate 41 of a stator core 21 in a vicinity of a root of a tooth portion 21b, so as to extend parallel to a width direction of the tooth portion 21b from a first end to a second end in the width direction of the tooth portion 21b.

Moreover, a remainder of the configuration is configured in a similar or identical manner to that of Embodiment 1 above.

In Embodiment 2, because varnish leakage stopping projections 25a are formed on end surfaces of tooth portions 21b so as to extend from a first end to a second end in the width direction of the tooth portions 21b, flow of varnish toward a core back portion 21a over the end surfaces of the tooth portions 21b is stopped by the varnish leakage stopping projections 25a.

Consequently, similar or identical effects to those in Embodiment 1 above can also be achieved in Embodiment 2.

Embodiment 3

Figure 10:
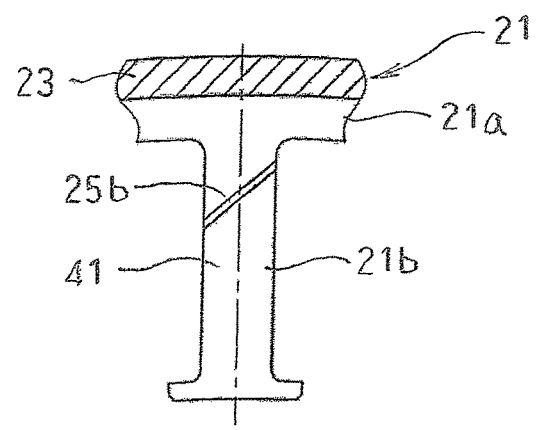
FIG. 10 is an end elevation that shows part of a stator core of a rotary electric machine according to Embodiment 3 of the present invention.

FIG. 10 is an end elevation that shows part of a stator core of a rotary electric machine according to Embodiment 3 of the present invention.

In FIG. 10, a varnish leakage stopping projection 25b is formed on a surface of an end plate 41 of a stator core 21 in a vicinity of a root of a tooth portion 21b, so as to extend so as to be inclined relative to a width direction of the tooth portion 21b from a first end to a second end in the width direction of the tooth portion 21b.

Moreover, a remainder of the configuration is configured in a similar or identical manner to that of Embodiment 1 above.

In Embodiment 3, because varnish leakage stopping projections 25b are formed on end surfaces of tooth portions 21b so as to extend from a first end to a second end in the width direction of the tooth portions 21b, flow of varnish toward a core back portion 21a over the end surfaces of the tooth portions 21b is stopped by the varnish leakage stopping projections 25b.

Consequently, similar or identical effects to those in Embodiment 1 above can also be achieved in Embodiment 3.

Embodiment 4

Figure 11:
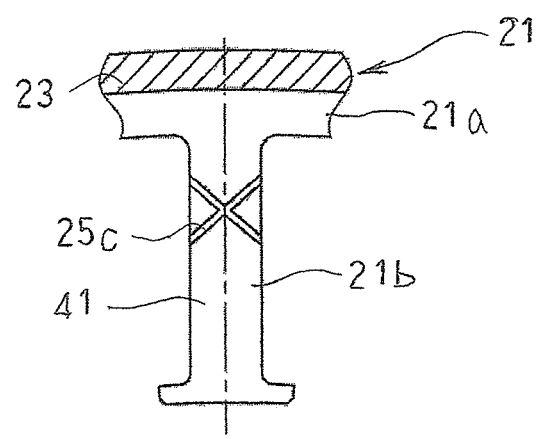
FIG. 11 is an end elevation that shows part of a stator core of a rotary electric machine according to Embodiment 4 of the present invention.

FIG. 11 is an end elevation that shows part of a stator core of a rotary electric machine according to Embodiment 4 of the present invention.

In FIG. 11, two varnish leakage stopping projections 25c are each formed on a surface of an end plate 41 of a stator core 21 in a vicinity of a root of a tooth portion 21b, so as to extend so as to be inclined relative to a width direction of the tooth portion 21b from a first end to a second end in the width direction of the tooth portion 21b so as to cross at a central portion in the width direction of the tooth portion 21b.

Moreover, a remainder of the configuration is configured in a similar or identical manner to that of Embodiment 1 above.

In Embodiment 4, because varnish leakage stopping projections 25c are formed on end surfaces of tooth portions 21b so as to extend from a first end to a second end in the width direction of the tooth portions 21b, flow of varnish toward a core back portion 21a over the end surfaces of the tooth portions 21b is stopped by the varnish leakage stopping projections 25c.

Consequently, similar or identical effects to those in Embodiment 1 above can also be achieved in Embodiment 4.

Moreover, in Embodiments 1 through 4 above, varnish leakage stopping portions are configured by making front surfaces of end plates protrude outward, but the varnish leakage stopping portions need only be able to stop the varnish from flowing onto the housing interfitting surfaces from a radially inner side, and may alternatively be configured by indenting the front surfaces of the end plates.

Embodiment 5

Figure 12:
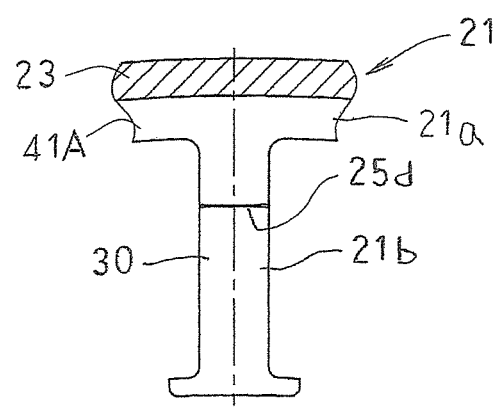
FIG. 12 is an end elevation that shows part of a stator core of a rotary electric machine according to Embodiment 5 of the present invention.

FIG. 12 is an end elevation that shows part of a stator core of a rotary electric machine according to Embodiment 5 of the present invention.

In FIG. 12, an end plate 41A is cut near a root end of a tooth portion 21b, such that a vicinity of a tip of the tooth portion 21b is missing. Thus, a stepped portion that extends from a first end to a second end in the width direction of the tooth portion 21b is formed on the tooth portion 21b at the cut portion of the end plate 41A. This stepped portion constitutes a varnish leakage stopping projection 25d.

Moreover, a remainder of the configuration is configured in a similar or identical manner to that of Embodiment 1 above.

In Embodiment 5, because varnish leakage stopping projections 25d are formed on end surfaces of tooth portions 21b so as to extend from a first end to a second end in the width direction of the tooth portions 21b, flow of varnish toward a core back portion 21a over the end surfaces of the tooth portions 21b, i.e., front surfaces of magnetic segments 30, is stopped by the varnish leakage stopping projections 25d. Consequently, similar or identical effects to those in Embodiment 1 above can also be achieved in Embodiment 5.

Moreover, in Embodiments 1 through 5 above, a stator core is constituted by two split cores that are produced by bending rectangular parallelepiped laminated cores so as to have semicircular shapes, but a stator core may alternatively be constituted by a single core that is produced by bending a rectangular parallelepiped laminated core so as to have an annular shape, or may alternatively be constituted by three or more split cores that are produced by bending rectangular parallelepiped laminated cores so as to have circular arc shapes.

In Embodiments 1 through 5 above, a stator core is constituted by two split cores that are produced by producing rectangular parallelepiped laminated cores by laminating a number of magnetic segments and two end plates that have been punched into oblong shapes, and bending the rectangular parallelepiped laminated cores so as to have semicircular shapes, but a stator core may alternatively be constituted by an annular laminated core that is produced by laminating a number of magnetic segments and two end plates that have been punched into annular shapes.

In Embodiments 1 through 5 above, varnish leakage stopping portions are formed on two end surfaces of a stator core at identical positions so as to have identical shapes, but varnish leakage stopping portions may alternatively be formed on two end surfaces of the stator core at different positions so as to have different shapes. For example, varnish leakage stopping projections may be formed on a first end surface of the stator core, and varnish leakage stopping recessed grooves formed on a second end surface of the stator core. Varnish leakage stopping projections may alternatively be formed on first end surfaces of a core back portion and second end surfaces of the tooth portions.

In Embodiments 1 through 5 above, two end portions of a stator core are constituted by end plates that are thicker than magnetic segments, but the stator core may alternatively be constituted by a laminated core that only has magnetic segments. In that case, the varnish leakage stopping portions should be formed on the magnetic segments that are positioned at the two axial ends.

Embodiment 6

Figure 13:
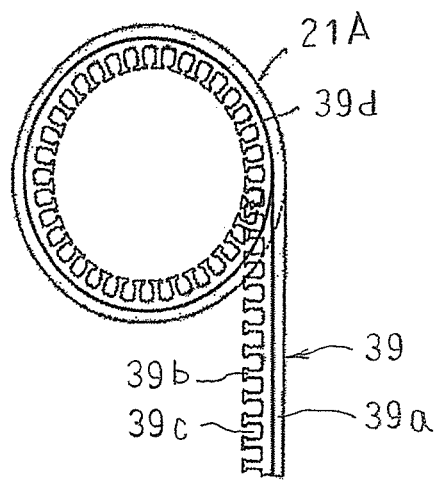
FIG. 13 is a plan that explains a method for manufacturing a stator core of a rotary electric machine according to Embodiment 6 of the present invention.
Figure 14:
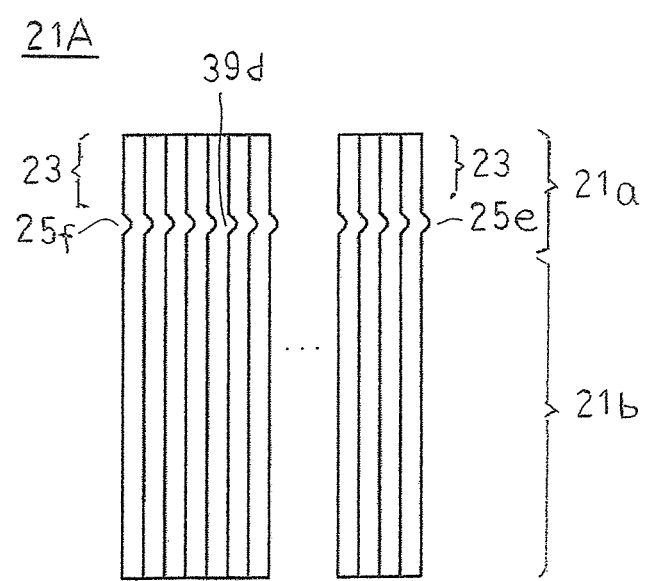
FIG. 14 is a cross section that shows the stator core of the rotary electric machine according to Embodiment 6 of the present invention.

FIG. 13 is a plan that explains a method for manufacturing a stator core of a rotary electric machine according to Embodiment 6 of the present invention, and FIG. 14 is a cross section that shows the stator core of the rotary electric machine according to Embodiment 6 of the present invention.

In FIG. 13, a stator core 21A is produced by winding a strip-shaped body 39 that is punched from an electromagnetic steel sheet that has a sheet thickness of 0.35 mm, for example, into a helical shape. The strip-shaped body 39 includes: a core back corresponding portion 39a that extends so as to have a first side in a width direction as a longitudinal direction; tooth corresponding portions 39b that are each disposed at a uniform pitch so as to protrude outward from the core back corresponding portions 39a toward a second side in the width direction; and a crimping portion 39d that is press molded into the front surface of the core back corresponding portion 39a on the second side in the width direction so as to extend longitudinally. Slot corresponding portions 39c are formed by the core back corresponding portion 39a and tooth corresponding portions 39b that are adjacent to each other.

Moreover, a remainder of the configuration is configured in a similar or identical manner to that of Embodiment 1 above.

The strip-shaped body 39 that is punched from the electromagnetic steel sheet is wound while stacking the core back corresponding portion 39a, the tooth corresponding portions 39b, the slot corresponding portions 39c, and the crimping portion 39d onto the core back corresponding portion 39a, the tooth corresponding portions 39b, the slot corresponding portions 39c, and the crimping portion 39d that have been wound before. The strip-shaped body 39 that is wound into the helical shape is fixed and integrated by crimping at the crimping portion 39d, as shown in FIG. 14, to become an annular laminated core. Then, the stator core 21A is produced by laser-welding an outer circumferential surface of the laminated core from a first end to a second end in an axial direction.

In the stator core 21A that is configured in this manner, the core back corresponding portion 39a is laminated to constitute a core back portion 21a, the tooth corresponding portions 39b are laminated to constitute tooth portions 21b, and the slot corresponding portions 39c are laminated to constitute slots 21c.

In Embodiment 6, a crimping portion 39d is formed in an annular shape on an inner circumferential side of a housing interfitting surface 23 on a first axial end surface of the core back portion 21a to constitute a varnish leakage stopping projection 25e. The crimping portion 39d is formed in an annular shape on an inner circumferential side of a housing interfitting surface 23 on a second axial end surface of the core back portion 21a to constitute a varnish leakage stopping recessed groove 25f. Thus, varnish that has flowed out to the core back portion 21a over the end surfaces of the tooth portions 21b is stopped from flowing onto the housing interfitting surfaces 23 from the radially inner side by the varnish leakage stopping projection 25e and the varnish leakage stopping recessed groove 25f. Consequently, similar or identical effects to those in Embodiment 1 above can also be achieved in Embodiment 6.

According to Embodiment 6, because a crimping portion 39d also functions as a varnish leakage stopping projection 21e and varnish leakage stopping recessed groove 25f, a step of additionally disposing varnish leakage stopping projections 21e and varnish leakage stopping recessed grooves 25f separately from the crimping portion 39d is no longer required, improving productivity of the stator core 21A.

Moreover, in Embodiment 6 above, a stator core is constituted by a laminated core that is produced by winding a strip-shaped body that is punched from an electromagnetic steel sheet that has a thin sheet thickness into a helical shape, but end plates that are punched from an electromagnetic steel sheet that has a thick sheet thickness may be disposed on two axial ends of the laminated core that is produced by winding the strip-shaped body into a helical shape. In that case, varnish leakage stopping portions should be formed on surfaces of the end plates.

Furthermore, in Embodiments 1 through 5 above, crimping portions that fix magnetic segments together and that fix the magnetic segments and end plates together by crimping may also be configured so as to function as varnish leakage stopping portions.

The invention claimed is:

1. A rotary electric machine comprising
a housing;
a rotor that is fixed to a rotating shaft that is rotatably supported by said housing, said rotor being disposed inside said housing; and
a stator comprising:
a stator core in which tooth portions are arranged circumferentially in a state in which each protrudes radially inward from an inner circumferential wall surface of an annular core back portion; and
a stator winding that is mounted to said stator core, and into which a varnish is impregnated,
said stator being held by said housing in a state in which housing interfitting surfaces on two axial end surfaces of said core back portion are clamped by said housing from two axial ends, and said stator being disposed so as to surround said rotor,
wherein:
a varnish leakage stopping portion is formed directly on each of two axial end surfaces of said stator core at a position on a radially inner side of said housing interfitting surfaces so as to interrupt flow pathways of said varnish from the radially inner side onto said housing interfitting surfaces.

2. The rotary electric machine according to claim 1, wherein said varnish leakage stopping portion is formed so as to have an annular shape on a radially inner side of said housing interfitting surface on at least one end surface of said two axial end surfaces of said core back portion.

3. The rotary electric machine according to claim 1, wherein said varnish leakage stopping portion is formed in a vicinity of said core back portion on at least one end surface of two axial end surfaces of said tooth portions so as to extend from a first end to a second end in a width direction of said tooth portions.

4. The rotary electric machine according to claim 3, wherein said stator core comprises:
a laminated body of first magnetic steel sheets; and
end plates that are constituted by second magnetic steel sheets that have a greater sheet thickness than said first magnetic steel sheets, said end plates being disposed on two axial end portions of said laminated body.

5. The rotary electric machine according to claim 1, wherein said varnish leakage stopping portion has a convex shape relative to said axial end surface of said stator core.

6. The rotary electric machine according to claim 1, wherein said varnish leakage stopping portion has a concave shape relative to said axial end surface of said stator core.

7. The rotary electric machine according to claim 1, wherein:
   said stator core is a laminated core of a plurality of magnetic steel sheets;
   said plurality of magnetic steel sheets each comprise a crimping portion that fixes together said magnetic steel sheets; and
   said crimping portion constitutes said varnish leakage stopping portion.

8. The rotary electric machine according to claim 1, wherein:
   said stator core is configured using a strip-shaped magnetic steel sheet that is wound into a helical shape;
   said magnetic steel sheet comprises a crimping portion that fixes said magnetic steel sheet that has been wound into said helical shape; and
   said crimping portion constitutes said varnish leakage stopping portion.

9. The rotary electric machine according to claim 1, wherein said stator core comprises:
   a laminated body of first magnetic steel sheets; and
   end plates that are constituted by second magnetic steel sheets that have a greater sheet thickness than said first magnetic steel sheets, said end plates being disposed on two axial end portions of said laminated body.

* * * * *